United States Patent
Chan et al.

(10) Patent No.: US 7,996,620 B2
(45) Date of Patent: Aug. 9, 2011

(54) HIGH PERFORMANCE PSEUDO DYNAMIC 36 BIT COMPARE

(75) Inventors: Yuen H. Chan, Poughkeepsie, NY (US); Ann H. Chen, Poughquag, NY (US); Kenneth M. Lo, Alexandria, VA (US); Shie-ei Wang, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 11/850,050

(22) Filed: Sep. 5, 2007
(Under 37 CFR 1.47)

(65) Prior Publication Data
US 2009/0063774 A1 Mar. 5, 2009

(51) Int. Cl.
*G06F 12/00* (2006.01)
*G11C 15/00* (2006.01)
*G11C 7/06* (2006.01)
*G11C 7/10* (2006.01)

(52) U.S. Cl. ........ 711/128; 711/118; 711/129; 711/168; 711/209; 711/211; 711/212; 711/217; 711/220; 365/49.1; 365/49.17; 365/189.07; 365/189.08

(58) Field of Classification Search ............ 365/230.02, 365/230.03, 189.07, 189.08, 49.1, 49.17; 711/118, 128, 129, 168, 209, 211, 212, 217, 711/220, 153, 154, 170, 173, 202, 205, 206, 711/207; 710/68; 714/48, 6, 7; 345/555, 345/230.02, 230.03, 189.07, 189.08
See application file for complete search history.

(56) References Cited

U.S. PATENT DOCUMENTS

| | | | |
|---|---|---|---|
| 4,905,188 A | | 2/1990 | Chung et al. |
| 4,916,696 A | | 4/1990 | Funakubo |
| 5,418,922 A | | 5/1995 | Liu et al. |
| 5,499,204 A | | 3/1996 | Barrera et al. |
| 5,515,024 A | | 5/1996 | Ghia et al. |
| 5,535,351 A | | 7/1996 | Peng |
| 5,584,014 A | * | 12/1996 | Nayfeh et al. ............... 711/134 |
| 5,588,130 A | | 12/1996 | Fujishima et al. |
| 5,680,363 A | | 10/1997 | Dosaka et al. |
| 5,694,362 A | | 12/1997 | Zhang et al. |
| 5,699,317 A | | 12/1997 | Sartore et al. |
| 5,740,412 A | * | 4/1998 | Chan et al. ............... 713/600 |
| 5,765,194 A | | 6/1998 | McBride |
| 5,778,428 A | | 7/1998 | Batson et al. |
| 5,802,594 A | | 9/1998 | Wong et al. |
| 5,822,338 A | | 10/1998 | Lo |
| 5,854,943 A | | 12/1998 | McBride et al. |
| 6,057,709 A | | 5/2000 | Hesley |

(Continued)

OTHER PUBLICATIONS

Pascatore, J.C., et al., "Pseudo-Cache-Based Architecture," *IBM Technical Disclosure Bulletin*, Dec. 1991, pp. 481-485, vol. 34, No. 7A.

(Continued)

*Primary Examiner* — Kevin L Ellis
*Assistant Examiner* — Mehdi Namazi
(74) *Attorney, Agent, or Firm* — William A. Kinnaman, Jr.

(57) ABSTRACT

A cache memory high performance pseudo dynamic address compare path divides the address into two or more address segments. Each segment is separately compared in a comparator comprised of static logic elements. The output of each of these static comparators is then combined in a dynamic logic circuit to generate a dynamic late select output.

20 Claims, 7 Drawing Sheets

U.S. PATENT DOCUMENTS

| | | | |
|---|---|---|---|
| 6,076,140 | A | 6/2000 | Dhong et al. |
| 6,226,731 | B1 * | 5/2001 | Dhong et al. ............ 711/203 |
| 6,317,351 | B2 | 11/2001 | Peng et al. |
| 6,356,990 | B1 | 3/2002 | Aoki et al. |
| 6,462,998 | B1 * | 10/2002 | Proebsting ............ 365/205 |
| 6,507,898 | B1 * | 1/2003 | Gibson et al. ............ 711/168 |
| 6,512,709 | B1 * | 1/2003 | Nakahara et al. ............ 365/200 |
| 6,928,005 | B2 * | 8/2005 | Ramaraju et al. ........ 365/189.07 |
| 6,988,164 | B1 * | 1/2006 | Wanzakhade et al. ........ 711/108 |
| 7,035,127 | B1 | 4/2006 | Adams et al. |
| 7,054,184 | B2 | 5/2006 | Chuang et al. |
| 7,116,569 | B2 | 10/2006 | Hinojosa et al. |
| 7,447,956 | B2 * | 11/2008 | Mamileti et al. ............ 714/718 |
| 2003/0061446 | A1 | 3/2003 | Lee et al. |
| 2007/0005891 | A1 | 1/2007 | Campbell |
| 2007/0090857 | A1 * | 4/2007 | Shau ............ 326/81 |

OTHER PUBLICATIONS

U.S. Appl. No. 10/844,296, Filed May 12, 2004—Non-Final Rejection mailed Mar. 8, 2005.

U.S. Appl. No. 10/844,296, Filed May 12, 2004—Notice of Allowance mailed Jan. 13, 2006.

* cited by examiner

HIGH PERFORMANCE PSEUDO DYNAMIC 36 BIT COMPARE

CROSS-REFERENCE TO RELATED APPLICATIONS

This application contains subject matter that is related to the subject matter of the following co-pending applications, each of which is assigned to the same assignee as this application, International Business Machines Corporation of Armonk, N.Y. Each of the below listed applications is hereby incorporated herein by reference in its entirely: Cache Late Select Circuit, Ser. No. 10/844,296 Filed May 12, 2004.

FIELD OF THE INVENTION

This invention relates to an improved set associative cache memory address comparator and more particularly to a pseudo dynamic address comparator.

BACKGROUND OF THE INVENTION

As will be appreciated by those skilled in the art, there art two paths in a set associative cache that are critical in terms of the time required to access the cache. One is the cache array access path and the other is the path that determines whether or not be memory address resides in the cache, the so-called hit logic path. For a red operation, in order to speed up the cache access, the hit logic operation and the cache array read operation are typically overlapped in times. That is, both operations are performed in parallel during the same clock cycle. As will also be appreciated by those skilled in the art, in a set associative cache, a tag memory stores at each addressable tag memory location the addresses of two or more (depending on the size of cache) blocks from main memory stored in the cache. A memory request address includes the cache tag memory address where the address of the requested data will reside in cache if it is in the cache. The addresses in the tag memory at that location are read out of the tag memory and compared with the memory request address. Static comparators and dynamic comparators have been proposed in the prior art for comparing die tag address with the requested address in set associative cache memories. However, the implementation of a fully static compare path is very complex and generally slow. Implementation of a fully dynamic compare path is complex both in circuit design and timing.

SUMMARY OF THE INVENTION

An object of this invention is the provision of a high performance address compare path in a set associative cache memory without the circuit complexity and timing complexity inherent in a dynamic address compare path.

Briefly, this invention contemplates the provision of a high performance pseudo dynamic address compare pa in which the address is divided into two or more address segments. Each segment is separately compared in a comparator comprised of static logic elements. The output of each of these static compares is then combined in a dynamic logic circuit to generate a dynamic late select output.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
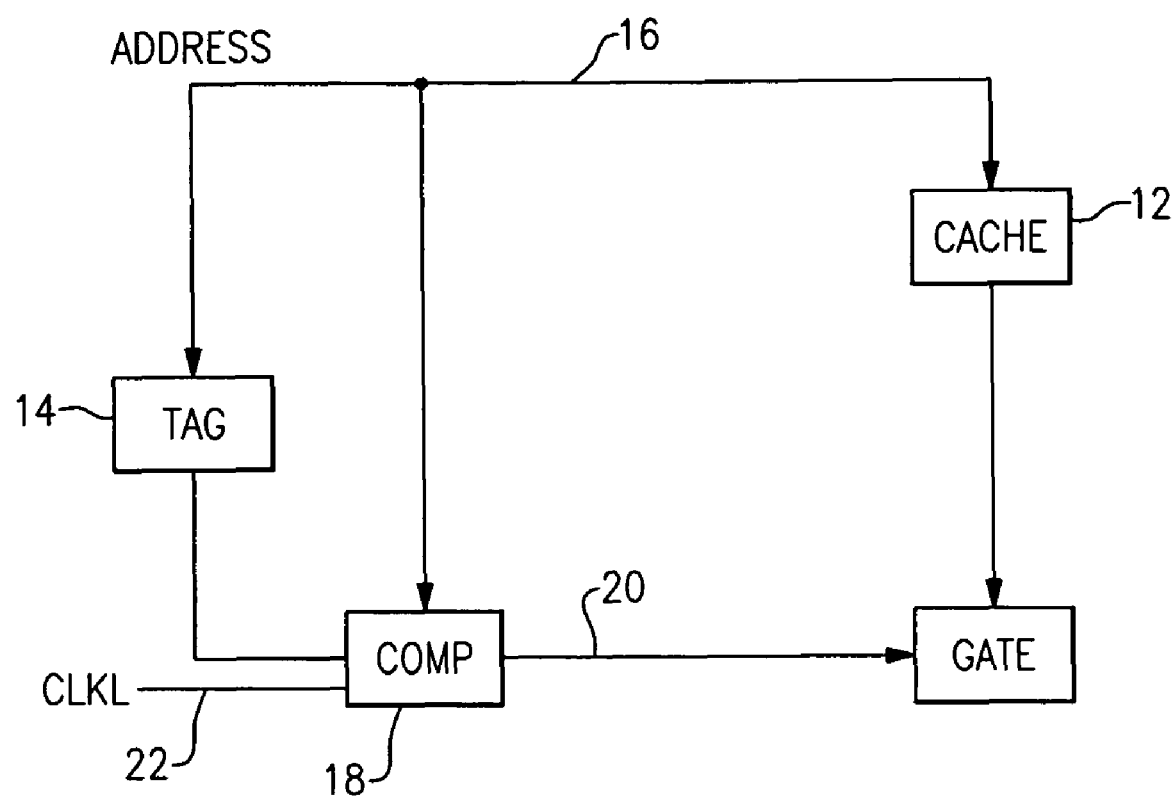
FIG. 1 is a simplified block diagram of one embodiment of a set associative cache memory employing a segmented address comparison using a high performance pseudo dynamic comparator in accordance with the teachings of this invention.

The invention will be explained in the context of a set associative cache with a 36-bit address. The advantages of the invention are particularly significant when implemented with a set associative cache with a large address, although the specific address size is not critical to its implementation. Referring now to FIG. 1, as will be appreciated by those skilled in the art, principal components of a set associative cache memory include: an array 12 of cache memory cells; a tag memory 14 that stores the addresses of the main memory data blocks that are currently stored in the array 12; an address buss 16 which carries the address of the data block sought in the cache; a comparator 18 that compares the address of the block sought with the address of the block in the tag memory; a hit output 20 from the comparator 18 that outputs the addressed block in the array 12 if there is a comparison, and a clock signal 22 that establishes the timing of operation. In accordance with the teaching of this invention, in making the comparison between the address stored in the tag memory and the block address on the address bus, the address is divided into two or more segments with each separately compared and the results of each comparison combined in a dynamic logic unit with the output dynamically latched. In this specific embodiment of the invention, with a 36-bit address, the address is divided into six segments of 6-bits each. A separate static comparator macro 24 is provided for each of the address segments and compares a segment of the address stored in the tag memory with a corresponding address segment from the address bus. The outputs of the comparators are combined in dynamic exclusive AND gate 26 that generates a hit output that is dynamically latched in L1 (can also be an L2, depending on cycle pipeline partitioning) latch 28 when the tag and memory address match.

Figure 2A:
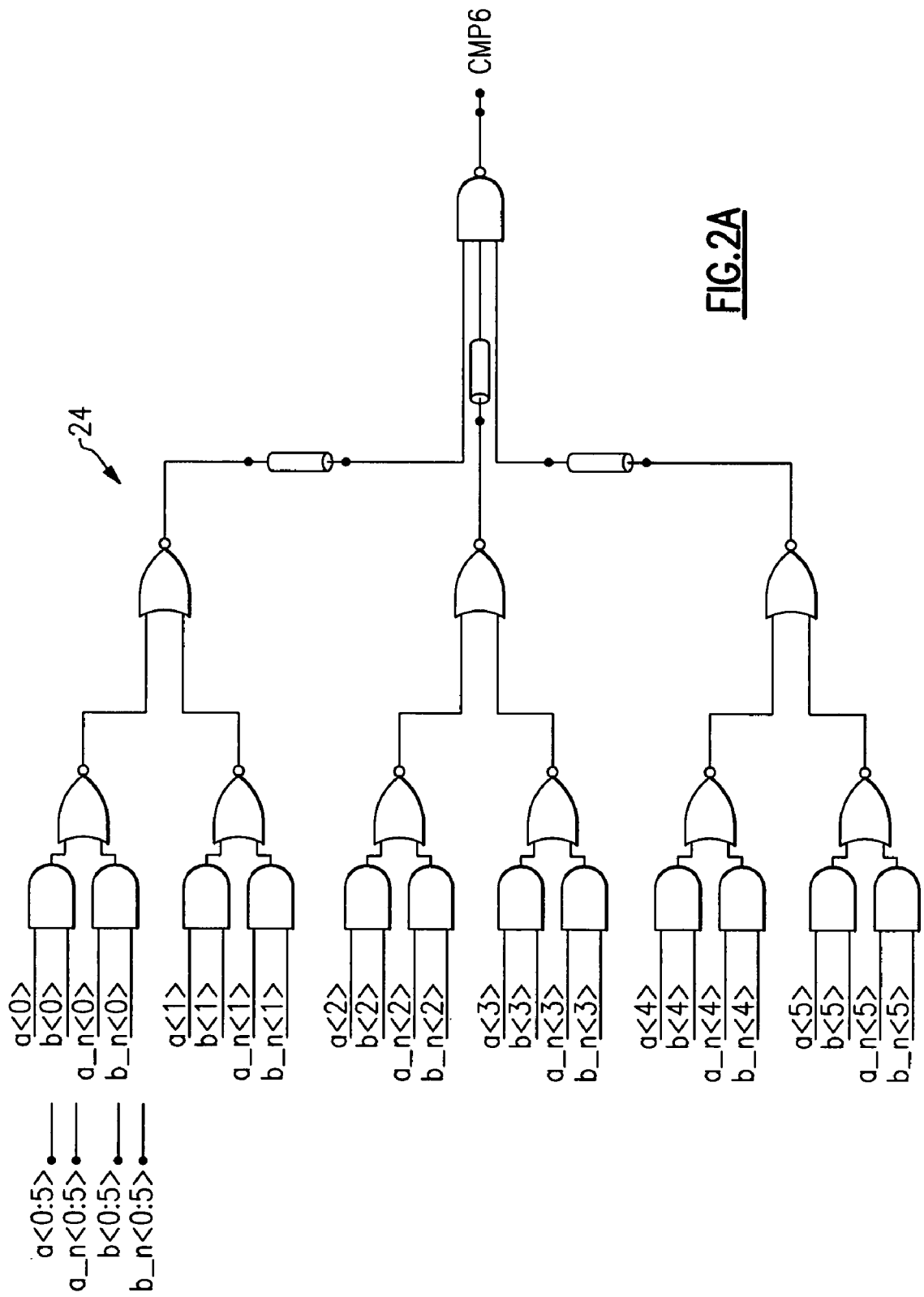
FIG. 2A is a schematic diagram of one exemplary embodiment of a static logic address comparator that can be used to implement the teaching of this invention.
Figure 2B:
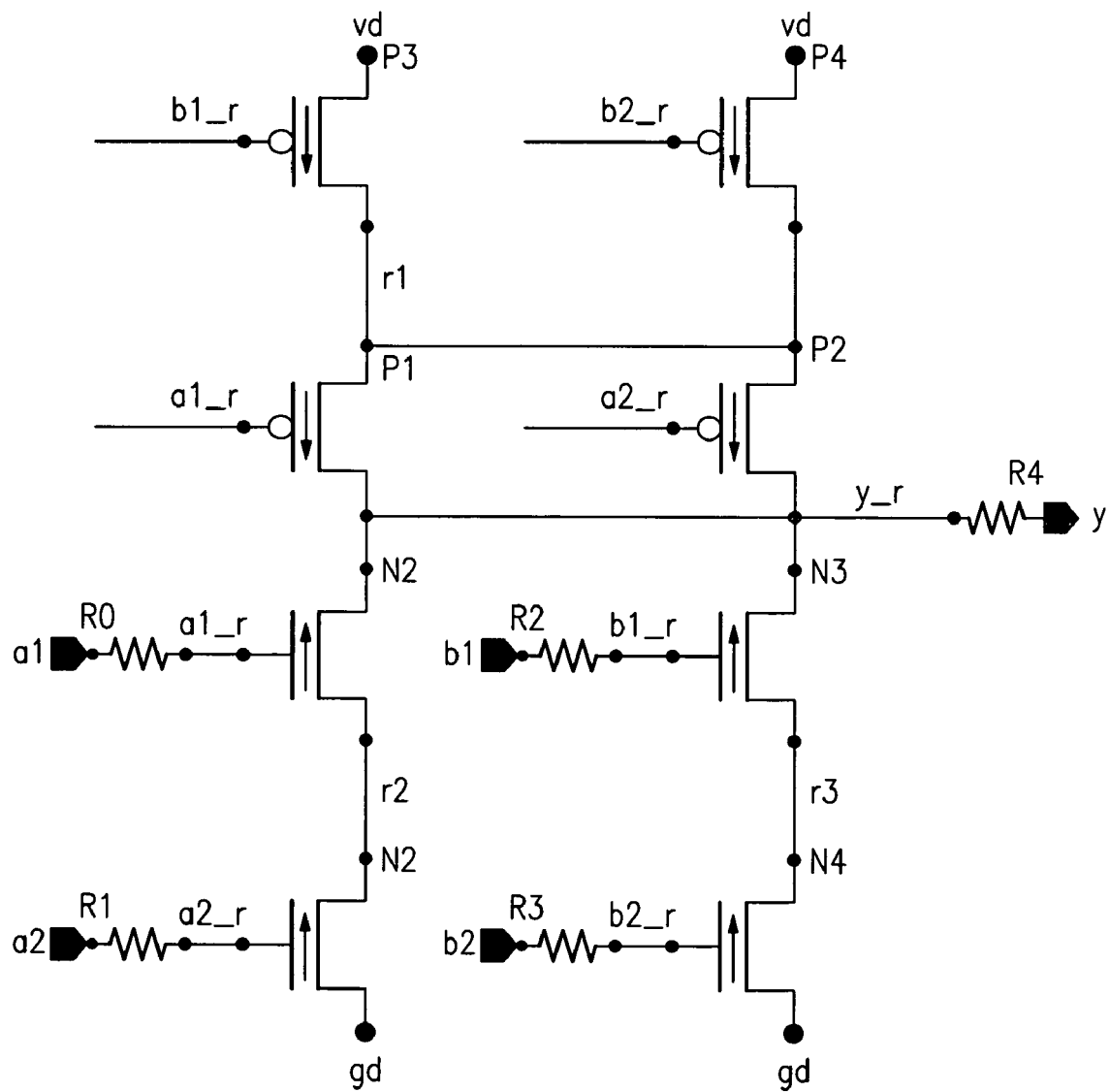
FIG. 2B is a schematic diagram showing detail of a first stage implementation of FIG. 2A.

FIG. 2A illustrates one exemplary embodiment of conventional static comparator logic that may be used in the practice of this invention. In his exemplary embodiment of the invention, a 36-bit address is divided into six 6-bit segments and combines the output of six static macros. Each of the 6-bit macro comparators is the same, and only macro 24 is shown in detail. Each macro has a pair of two input first stage AND gates and a first stage NOR gate to compare respectively the true and complement of one bit of the tag address with the true and complement of the corresponding bit of the memory address. To minimize circuit delay, this first stage bit compare function is implemented by using an AOI (And-Or-Invert) gate which only has 1 stage of circuit delay FIG. 2B. A second stage NOR gate combines the outputs of adjacent front-end first stage NOR gates. A third stage, three input NAND gate combines the result of the comparison of a six-bit segment of the address. When all six bits are matched, output of this 6-bit compare macro will be low (at "0" logic level). If any bits are not matched, the output will stay high. This static implementation of the 6-bit compare macro has the attribute of minimum circuit switching delay. The total circuit delay through the macro is only 3 stages (1 stage dim the AOI, 1 stage thru the NOR, and 1 stage thru the NAND). It enables the pseudo dynamic 36 bit compare to have fast performance even with a static front end compare sub-block.

Figure 3:
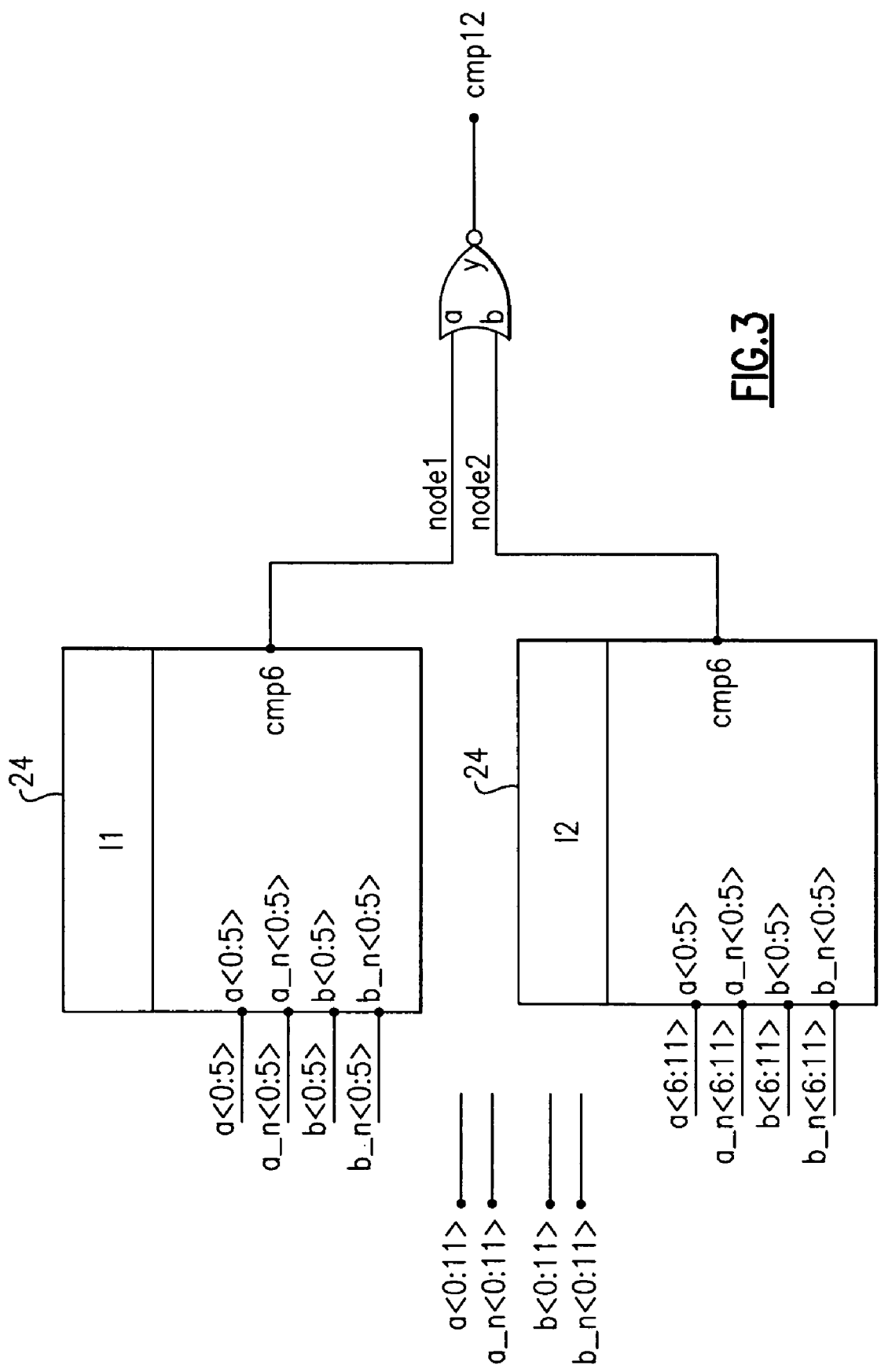
FIG. 3 is a block diagram showing the logical combination of the outputs from the address segment comparators in accordance with the teachings of this invention.

As illustrated in FIG. 3, the outputs of the six macros are combined two at a time by means of a static NOR gate (only two of the six are shown in FIG. 3) to generate three outputs, din1, din2, and din3. Each output (cmpl2 in FIG. 3) represents the compare result of 12 bits address segment. If all 12 bits are matched, cmpl2 will be high (at "1" level). It will be appreciated that in the illustrated embodiment, these outputs will be at the same logic state only if there is a match between the tag and memory segment in all six macros.

Figure 4:
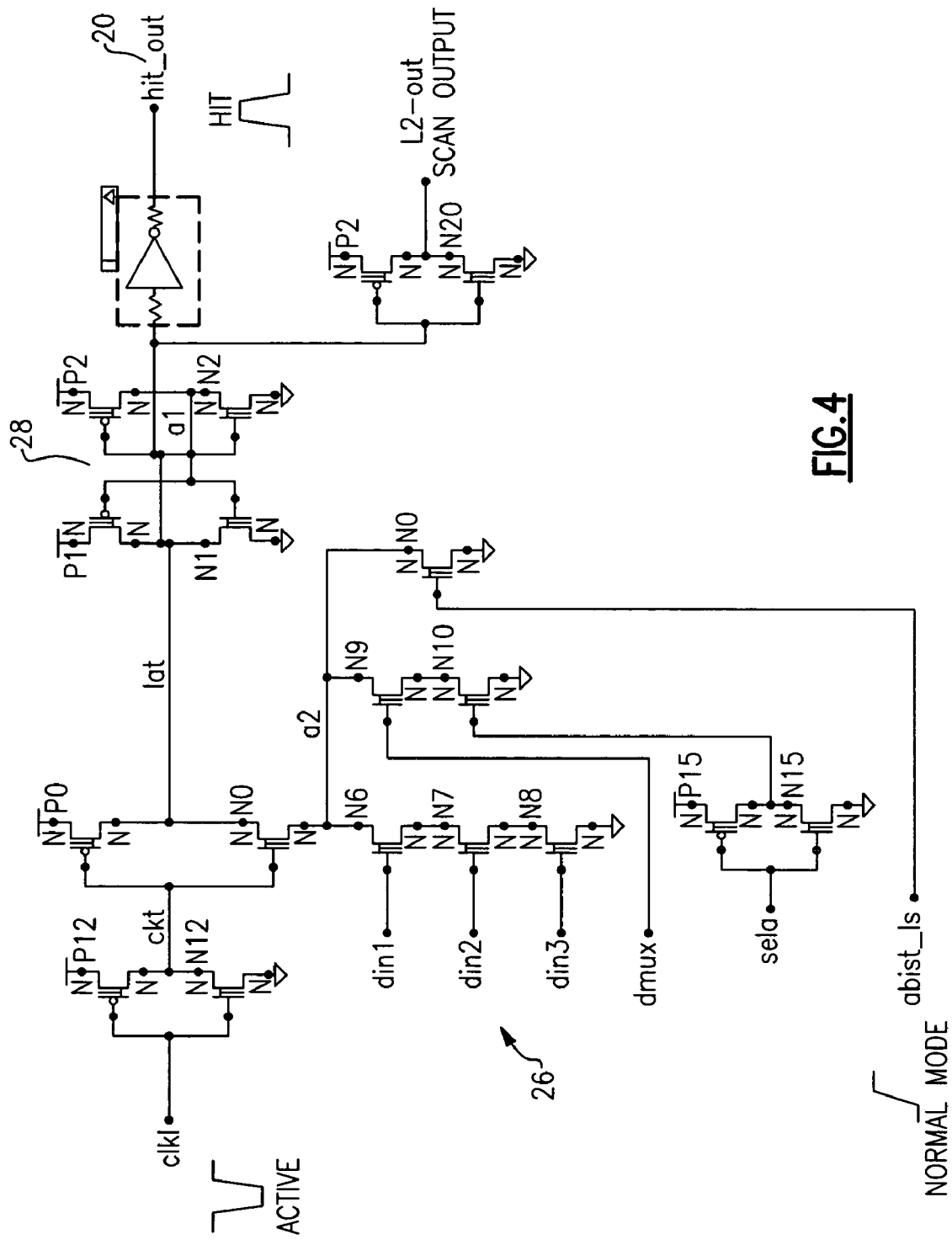
FIG. 4 is a schematic diagram of the dynamic logic used to combine the outputs of the static logic address segment comparators to generate a dynamic late select signal in accordance with the teachings of this invention.

FIG. 4 shows schematic diagram of the last stage of the 36 bit comparator. It is a high performance dynamic circuit that provide several functions, 1) a dynamic latch to hold the compare result across cycle boundary; 2) a 3-input AND to sum up the compare result from din1, din2, and din3; 3) a dynamic 3-way input MUX to provide data and test override; 4) a dual output driver to provide separated high power dynamic output (hit_out) and low power scan path output (I2_out), A unique feature of this circuit is its minimum switching delay. The critical signal path (from din to hit_out) only has two inverter stages of delay. The first stage is the 3-input NAND stack, the second stage is the high power inverter driving the hit_out output. Hit_out is a dynamic signal with a rest (standby) state at low level and an active (compare matched) state at high level. To further enhance fast switching, the high power output inverter/driver is tuned to provide fast rising and slower falling slew rate. Typical optimum slew rate ratio is in the range of 1 to 3.

More detail circuit function of FIG. 4 is now described. The dynamic latch (can be either an L1 or an L2, depending on logic pipeline partition), consisting of CMOS devices P1-P2-N1-N2, is reset by the control clock clkl. clkl has the logical equivalency of a C2 clock in a master-slave L1/L2 latch configuration. When clkl is high, the latch is reset (i.e., node lat is pulled high and node aI is kept low), outputs hit_out and I2_out stay at a down level, designating a non-match state. In this state, the circuit is said to be in standby mode. All inputs to the circuit are ignored and the outputs are stable at the down level.

When the static inputs of din1, din2, and din3 are setup and become stable to be evaluated, clkl is turned active from a high to low level (i.e., clkl is active low). If all 3 din inputs are high, which designate a match of all the bits, the dynamic node "lat" will be pull low through the NFET stack. Output hit_out will then be driven high by the inverter/driver. If one or more of the din inputs are low, which designate non-matching of some of the bits, node "lat" will stay high and hit_out will remain in the standby low level. At the end of an active cycle, after the dynamic signal is properly captured by down stream logic, clkl is returned to high level again to reset the L2 latch and the hit_out output. The pulse width of the dynamic hit_out signal therefore is directly controllable by clkl timing.

The main critical path of the circuit is through din1-3. To provide alternative paths for ABIST (Array Built In Self Test) and LBIST (Logic Built In Self Test) testing, or for logic override (to generate a forced match disregarding the din inputs), a 3-way dynamic MUX is formed at node "lat" of the circuit. Input dmux is the logic override path which is controlled by the MUX select signal "sela". If sela is high, node "lat" will be forced low when dmux input is asserted (by a high level). The third input path is the abist_ls leg used by ABIST/LBIST testing. During test mode operation, abist_ls is controlled by the ABIST/LBIST engine and can be used to generate a forced hit condition to verify down stream logic without going through the full compare function.

Figure 5:
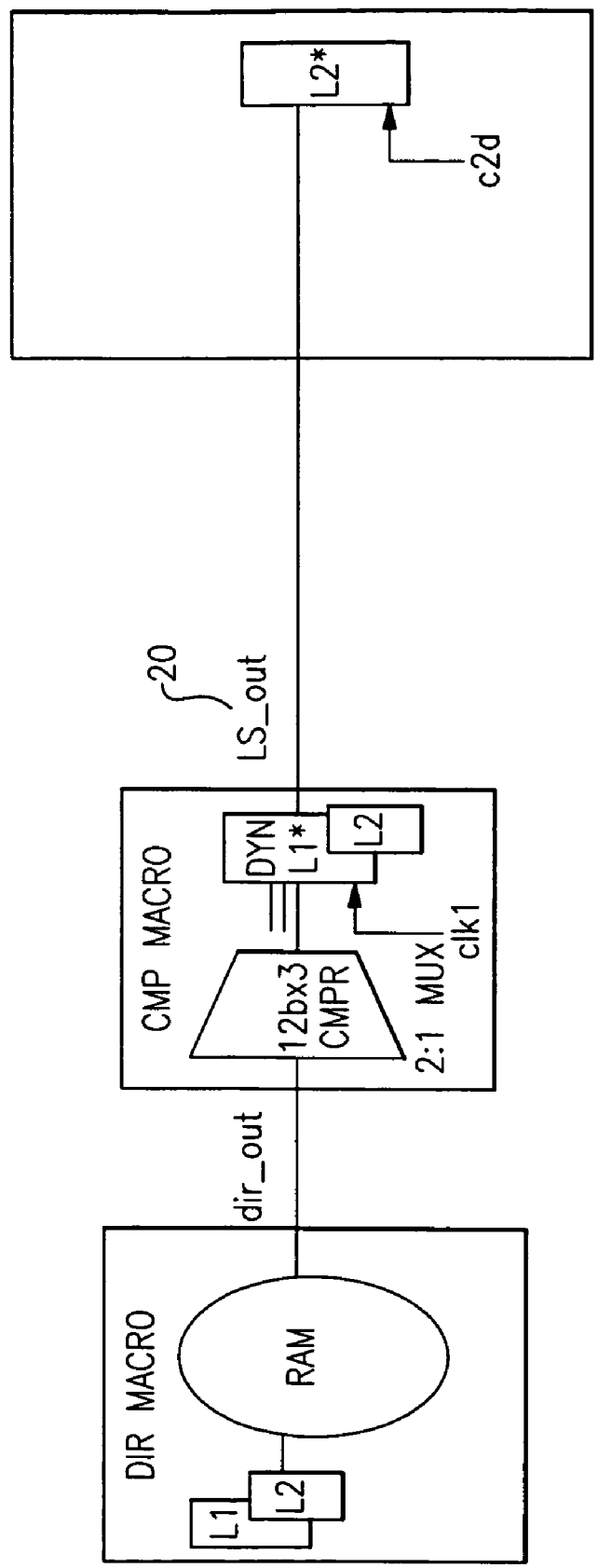
FIG. 5 is a diagram of a cache directory/tag compare critical path.

The high performance pseudo dynamic 36 bit compare topology as shown, or a variation of it, can be used in different logic applications. FIG. 5 illustrates one in the cache look up path of a microprocessor system. The cache structure could be an L1 or an L2, either a Data or an Instruction cache. This cache lookup path consists of a directory array (DIR macro) which stores either the logical or absolute address of a line of data in the cache array (CAC macro). The cache line address is read from the directory macro and sent over to an address comparator (CMP macro) to determine if a hit (or match) of the requested address and stored address occurs. If an address hit is detected, the hit information is sent to the cache macro as a late select signal (ls_out). As described earlier, the cache is typically partitioned into multiple associative sets. All the sets are read in parallel during a cache access. Only one of the sets will be selected by the late select signal and driven out as the cache data output to the receiving logic. The illustration shown in FIG. 5 denotes the compare hit_out as cycle stage in an L1 latch, where as the late select data in the cache is cycle staged in an L2 latch. This L1/L2 cycle partitioning could be changed according to the pipeline requirement of a particular microprocessor design.

Figure 6:
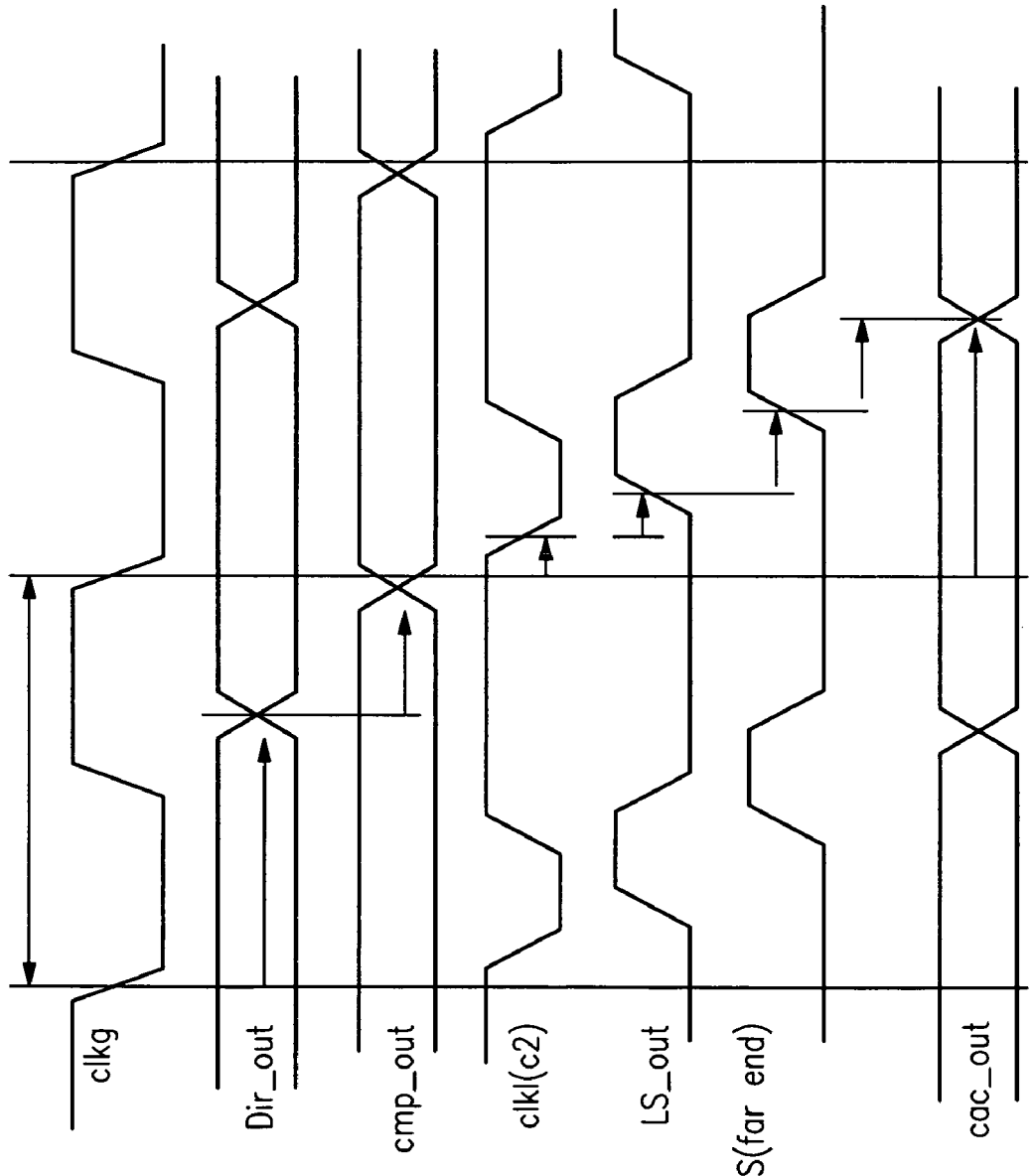
FIG. 6 is a timing diagram of the operation of high performance pseudo dynamic address compare path in accordance with the teachings of this invention.

FIG. 6 shows the critical path timing diagram of the lockup structure illustrated in FIG. 5. As an example, this cache lookup structure is a 2 cycle operation. The first cycle is the directory access, partial actress static compare (12 bits segments), and cache parallel set read access. The second cycle is the final dynamic 36 bit compare summation, hit/miss late select generation and cache data output. Clkg is the global clock which is shown as active low. At the beginning of the first cycle when clkg falls, it triggers the directory and cache macro access. Directory output (Dir_out) will be available in the second half of the first cycle, the cache multi set RAM output (not shown) will be available at the end of the first cycle or beginning of the next cycle (dependent on cycle time and cache read latency). The address field of the directory output are sent over to the 12 bit×3 static comparators, results of the 12 bit partial compare (cmp_out) are available before the end of the first cycle, waiting to be evaluated by the pseudo dynamic comparator.

At the beginning of the second cycle when clkg falls again, a local clock (clkl) is generated within the compare macro. It triggers the dynamic 3 way AND of din1-din3 (coming from the 3 12-bit segment comparators). If that is an address match (a hit), a late select signal (LS_out) is generated. This dynamic late select signal is sent over to the cache macro for a 1-out-of-n set output selection. The cache data output (cac_out) is available shortly after.

The key advantages of the pseudo dynamic comparator disclosed are two fold. First is its high speed performance. The total critical path delay from compare input to hit output, including a high power driver for driving large output loads, is only 5 inverter stages (3 stages in the 12-bit static segment compare, 2 stages in the final dynamic AND/latch/hit drive circuit). This is at least 2-3 stages shorter than a fully static implementation. Second is its circuit and timing simplicity. The first cycle operation is fully static. The second cycle uses a simple local clock (either a custom "clkl" or a modified C2 clock of a master-slave latch design) for triggering and controlling the dynamic circuit function. This clocking scheming is relatively simple when compared with a typical fully dynamic circuit implementation.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing orders or steps may be added, deleted or modified. All of these variations are considered a pan of the claimed invention.

While the preferred embodiment to the invention has been described, it will be understood that those skilled in the art, both now and in the future, may make various improvements and enhancements which fall with the scope of the claims which follow. These claims should be construed to maintain the proper protection for the invention first described.

What is claimed is:

1. A set associative cache memory address comparator comprising in combination:
    a plurality of comparator macros each comprised of static logic elements;
    a bus to couple a different segment of said cache memory address and a bus to couple a corresponding segment of a cache memory tag address to an input of each of said plurality of comparator macros;
    each of said plurality of comparator macros generating a hit output if there is a bit by bit comparison between the cache memory segment and the tag memory segment coupled to its input;
    a dynamic logic gate with an input from an output of each of said plurality of comparator macros;
    said dynamic logic gate generating a cache select signal if the output state from each said plurality of comparator macros is said predetermined binary output state.

2. A set associative cache memory address comparator as in claim 1 further including a dynamic latch to the cache select signal across a clock cycle boundary.

3. A set associative cache memory address comparator as in claim 1 further including a dynamic input multiplexer to said dynamic logic gate in order to provide selectable data and test operation.

4. A set associative cache memory address comparator as in claim 1 further including a high power output driver for said cache select signal and a separate low power output driver for a scan output.

5. A set associative cache memory address comparator as in claim 2 further including a dynamic input multiplexer to said dynamic logic gate in order to provide selectable data and test operation.

6. A set associative cache memory address comparator as in claim 2 further including a high power output driver for said cache select signal and a separate low power output driver for a scan output.

7. A set associative cache memory address comparator as in claim 3 further including a high power output driver for said cache select signal and a separate low power output driver for a scan output.

8. A cache memory address comparator as in claim 1 wherein said dynamic logic gate includes a dynamic latch that is set to a standby state by a clock signal in its inactive state, a stack of series connected transistors each respectively controlled by an input from one of said comparator macros, said stack of series connected transistors causing said dynamic latch to switch from said standby state when said clock signal is in its active state and an input to each of said stack of series connected transistors is said hit output, whereby the duration of a hit output of said comparator macros is determined by said clock signal.

9. A cache memory address comparator as in claim 8 wherein when said clock signal is in its inactive state inputs to the dynamic logic gate are ignored and the output of the dynamic logic gate is stable.

10. A method for generating a cache select signal in a set associative cache memory, including the steps of:
    dividing a cache memory address into a plurality of cache address memory segments;
    dividing a cache tag address into said plurality of tag address memory segments;
    comparing each of said cache memory address segments with each corresponding ones of said tag memory address segments in a static comparison process to generate a hit output from each comparison;
    combining each result of the comparing step in a dynamic logic process to generate a cache select signal if each result of the comparing step is said hit output.

11. A method for generating a cache select signal in a set associative cache memory as in claim 10 including the further step of holding said cache select signal across a clock cycle boundary.

12. A method for generating a cache select signal in a set associative cache memory as in claim 10 including the further step of generating a high power dynamic output for said cache select signal and generating a low power output for a scan output signal.

13. A method for generating a cache select signal in a set associative cache memory as in claim 11 including the further step of generating a high power dynamic output for said cache select signal and generating a low power output for a scan output signal.

14. A method for operation of a cache memory address comparator comprising in combination the steps of:
    dividing a cache memory address into a plurality of cache memory address segments;
    dividing a cache tag address into said plurality of tag memory address segments;

statically comparing each of said cache memory address segments with each corresponding ones of said tag memory address segments process to generate a hit output from each comparison;

dynamically combining each hit output to generate a cache select signal if each result of the comparing step is said hit output.

15. The method of claim 14 further including multiplexing data and scan inputs to generate a cache select signal if each result of the comparing step is said hit output.

16. The method of claim 14 further including dynamically latching to the cache select signal across a clock cycle boundary.

17. The method of claim 14 further including generating a high power output for said cache select signal and generating a low power output for a scan output signal.

18. The method of claim 15 further including dynamically latching to the cache select signal across a clock cycle boundary.

19. The method of claim 15 further including generating a high power output for said cache select signal and generating a low power output for a scan output signal.

20. The method of claim 18 further including generating a high power output for said cache select signal and generating a low power output for a scan output signal.

* * * * *